United States Patent [19]
Cherenko et al.

[11] 4,277,299
[45] Jul. 7, 1981

[54] RELEASE MOLDS FOR LAMINATING BILAYER SAFETY GLASS

[75] Inventors: Joseph Cherenko, Valencia; William I. Frey, Curtisville; Joseph D. Kelly, Cheswick, all of Pa.; Larry S. Sokol, West Palm Beach, Fla.

[73] Assignee: PPG Industries, Inc., Pittsburgh, Pa.

[21] Appl. No.: 49,673

[22] Filed: Jun. 18, 1979

Related U.S. Application Data

[63] Continuation of Ser. No. 836,178, Sep. 23, 1977, abandoned.

[51] Int. Cl.$^3$ .................. B32B 17/10; B32B 31/04; C04B 35/68
[52] U.S. Cl. ..................... 156/242; 106/38.22; 156/99; 156/289; 264/338
[58] Field of Search .............. 156/289, 99, 102, 106, 156/242; 106/38.22, 38.27; 264/338; 427/163, 164, 387, 420, 133, 135, 184; 428/429, 430, 431, 437; 260/33.6 SB, 33.8 SB

[56] References Cited

U.S. PATENT DOCUMENTS

| 2,047,253 | 7/1936 | Brooks ........................... 296/84 |
| 2,120,628 | 6/1938 | Reid ............................. 296/84 |
| 2,184,876 | 12/1939 | Sherts .......................... 260/46.5 R |
| 2,811,408 | 10/1957 | Braley .......................... 264/331 |
| 3,002,946 | 10/1961 | Thomas ......................... 260/29.1 R |
| 3,015,637 | 1/1962 | Rauner et al. .................. 260/22 |
| 3,451,838 | 6/1969 | Burzynski et al. .............. 422/164 |
| 3,509,015 | 4/1970 | Wismer et al. ................. 156/106 |
| 3,580,939 | 5/1971 | Ceyzeriat et al. ............. 260/46.5 G |
| 3,808,077 | 4/1974 | Rieser et al. .................. 156/106 |
| 3,936,578 | 2/1976 | Dumoulin et al. .............. 428/429 |
| 4,042,643 | 8/1977 | Creasey et al. ............... 260/46.5 G |

Primary Examiner—Michael W. Ball
Attorney, Agent, or Firm—Donna L. Seidel

[57] ABSTRACT

A transparent safety glass laminate having an optically acceptable exposed plastic surface is fabricated by laminating an outer glass sheet and an inner preformed plastic sheet under heat and pressure with the plastic surface to be exposed supported against an optically smooth mold, preferably a second glass sheet, which is coated with an optically smooth coating of a material which acts as a release agent to facilitate separation of the plastic surface from the mold after lamination.

1 Claim, No Drawings

RELEASE MOLDS FOR LAMINATING BILAYER SAFETY GLASS

CROSS REFERENCE TO RELATED APPLICATION

This application is a continuation of U.S. Ser. No. 836,178 filed Sept. 23, 1977 by the same inventors and now abandoned.

BACKGROUND OF THE INVENTION

1. Field of the Invention

The present invention relates generally to the art of fabricating safety glass laminates and more particularly to the art of safety glass laminates with exposed plastic surfaces.

2. The Prior Art

Safety glass is a well-known term describing a glass-plastic laminate designed to reduce the severity of lacerative injuries. A plastic film is laminated to a glass sheet so that, upon impact sufficient to break the glass, the film adheres to the glass fragments, thus minimizing their dispersion. Commercially available safety glass is most commonly a multiple laminate of two glass sheets with an interlayer of polyvinyl butyral.

U.S. Pat. No. 2,047,253 to Brooks discloses that a safety glass laminate comprising a single glass sheet and a layer of plastic is more resistant to breakage by impact than a conventional trilayer laminate.

U.S. Pat. No. 2,120,628 to Reid claims bilayer laminates comprising a single glass sheet and a layer of polyvinyl acetal resin, but does not disclose a fabrication method.

U.S. Pat. No. 2,184,876 to Sherts discloses laminating glass to plasticized polyvinyl acetal using an outer layer of unplasticized resin covered by a flexible sheet plated with chromium as a parting material to facilitate release of the plastic surface.

U.S. Pat. No. 2,811,408 to Braley teaches generally the use of a copolymeric siloxane resin as a release agent on metal, wood, ceramic or plastic mold surfaces.

U.S. Pat. No. 3,509,015 to Wismer et al discloses fabricating bilayer safety glass by casting a polyurethane film between a glass sheet and a mold coated with a release agent to facilitate removal of the bilayer laminate from the mold. No particular release agents are suggested.

U.S. Pat. No. 3,808,077 to Rieser et al discloses fabricating bilayer safety glass by assembling a preformed plastic sheet between a glass sheet and a mold coated with a release agent. Suggested release agents include polyvinyl fluoride, polyethylene glycol terephthalate, organopolysiloxanes, and high silica content glass resins.

Whether a bilayer laminate is fabricated with a polymer cast and cured in place or a preformed thermoplastic sheet, the plastic surface to be exposed is pressed against a mold surface during fabrication. That surface, therefore, must have an optical finish, preferably equivalent to polished glass, in order to impart an optical finish to the plastic. For this reason, glass is a particularly suitable material for the pressing mold. In addition, a glass mold withstands the laminating process conditions, is simple and inexpensive to form, and has physical properties similar to the glass ply of the laminate so that distortion of the plastic during lamination is minimized.

However, the pressing surface must also have low adhesion, that is, good releasability from the plastic. Glass does not. Therefore, a release agent, a material which does not adhere to one or the other of the glass or plastic, must be disposed between the plastic and the pressing surface. While such commercially available release agents as polyvinyl fluoride and poly(tetrafluoroethylene) provide acceptable release properties, the surface presented to the plastic layer during lamination is not optically smooth, resulting in optical distortion of the plastic which is unacceptable.

The quality of the release surface is most critical in the fabrication of curved bilayer windshields for automobiles. Curved bilayer windshields have an outer glass ply the exterior surface of which is convex and an inner plastic ply the interior surface of which is concave. Therefore the surface of the mold which is pressed against the plastic must be convex. Thus during lamination the bilayer windshield is in effect wrapped around the mold making the release more difficult than the release of flat laminates.

The present invention discloses a method for coating the pressing surface of a glass mold to produce a superior release surface for use in making safety glass with an exposed plastic surface that is free of optical defects.

SUMMARY OF THE INVENTION

The present invention involves assembling a preformed thermoplastic sheet of uniform thickness between a first glass sheet to which it will be laminated and a second glass sheet which serves as a pressing mold during lamination. The second glass sheet typically has the same shape and physical properties as the first glass sheet to avoid distortion of the plastic during lamination. The surface of the second glass sheet which is in contact with the plastic sheet during the lamination is an optically smooth rigid surface in order to impart an optically smooth surface to the plastic sheet. In addition, the surface of the second glass sheet is coated with an optically smooth coating of a release agent in order to facilitate separation of the laminate after lamination without impairing the optical quality of the plastic surface.

The coating of release agent is less than 0.005 inch (0.13 millimeter) thick typically 0.002 inch (0.05 millimeter) thick, or less. The release agent is preferably a material which adheres to the glass but not to the plastic, so that the pressing mold may be reused without recoating. Silane, siloxane, and silizane resins that cure to form films which adhere to glass but not to the plastic innerlayer are employed in the following manner.

The unreacted resin is diluted with solvent to form a free-flowing solution capable, upon evaporation of the solvent, of forming a thin film of sufficient uniformity that the film is not detectable by visual observation with the unaided eye. To the solution is added a low molecular weight, hydroxy-functional organosiloxane to improve the release efficiency of the resultant coating since even slight adhesion to the plastic may cause distortion and optical defects in the plastic layer upon removal of the pressing mold.

The coating solution is applied to the pressing surface of the mold and the solvent evaporated to form a thin uniform film. The film is then subjected to a sufficiently high temperature for a sufficient time to cure the resin. The resultant product is a glass mold, the pressing surface of which is coated with an optically smooth coating of a release agent from which the plastic surface of a laminate may be separated without impairing its optical properties.

DETAILED DESCRIPTION OF THE PREFERRED EMBODIMENTS

Preparation of the Mold

A substrate of the desired size and shape and with a surface of the requisite optical smoothness is selected for use as a pressing mold in the lamination of plastic to glass. While metal or certain plastics could be employed, the preferred substrate is glass. Glass has an exceptionally smooth and durable surface, it can be readily formed to the desired size and shape, and a glass plate of proper thickness exhibits the rigidity needed for pressing but with sufficient flexibility to facilitate separation of the mold from the finished laminate.

The preferred glass mold is about ⅛ inch thick and preferably has physical properties such as hardness, Young's modulus, and thermal expansion coefficient similar to the glass to be laminated. While any typical commercially available sheet, plate or float glass compositions may be used in the fabrication of laminated safety glass, soda-lime-silica float glass having the following composition is preferred.

| Component | Percent by Weight |
|---|---|
| $SiO_2$ | 71 to 74 |
| $Na_2O$ | 12 to 14 |
| $K_2O$ | 0 to 1 |
| CaO | 8 to 12 |
| MgO | 2 to 5 |
| $Na_2SO_4$ | 0.1 to 1 |
| $Fe_2O_3$ | 0.1 to 1 |
| $Al_2O_3$ | 0.1 to 1 |

Preferably, the same glass composition is used for both the glass mold and the glass lamina.

If the laminate is to be curved, such as an automobile windshield, the mold is conformed to the desired contours of the laminate. A technique for bending glass sheets by a gravity sag method is described in U.S. Pat. No. 3,453,161 to Golightly. Such a technique may be employed advantageously to bend a multiplicity of glass sheets simultaneously. One of the sheets may then be used as a mold and the others as laminae. Alternatively, individual glass sheets may be contoured by press bending methods as described in U.S. Pat. No. 3,367,764 to Seymour for vertical press binding and U.S. Pat. No. 3,374,077 to Cypher for horizontal press binding.

The surface of the glass mold which is to be in contact with the plastic lamina during lamination is coated with a release agent such as silane, siloxane or silazane resins capable of forming a film which upon curing is adherent to the glass mold but not to the plastic innerlayer of the laminate. Preferred release agents include polysiloxane resins having the following composition:
1. from 80 to 98 percent by weight of a phenyl methyl polysiloxane resin with from 1 to 1.7 hydrocarbon radicals per silicon atom.
2. from 1 to 10 percent by weight of a phenyl methyl siloxane fluid which has from 1.99 to 2.00 hydrocarbon radicals per silicon atom and which contains at least 1 percent by weight of silicon-bonded hydroxyl groups and
3. from 1 to 10 percent by weight of a non-hydroxylated methyl siloxane fluid which has at least 2.0 monovalent hydrocarbon radicals per silicon atom.

Such a resin is available from the Dow Corning Company as "R-671 Resin" a solution containing about 20 percent resin. A mold coated with such release agents may be cleaned for reuse by flushing with solvents and blowing dry.

Other preferred agents are silizane compounds which yield cured films of polymethyl silane or polymethyl siloxane which are durable and adherent to glass but non-adherent to the plastic innerlayer. A particularly preferred release agent is available from Frekote, Inc. as Frekote 33, a solution containing about 0.5 percent of a disilizane. A mold coated with such release agents is durable enough to withstand repeated severe cleaning and can be reused indefinitely. The coating operation is moisture sensitive and should be conducted at an absolute humidity less than 0.01 pounds of water per pound of dry air preferably at ambient temperature, 35 percent relative humidity to avoid the formation of haze streaks.

The solution of release agent is further diluted with a solvent or a mixture of solvents. The selection of diluting solvent is important in order to obtain an optical coating by flow application. The solvent must provide a proper combination of wetting properties, surface tension, viscosity, volatility and compatability with the resin. Suitable solvents include methyl ethyl ketone, toluene, chloroform, acetone, methylene chloride, isopropanol, trichloroethane, trichlorethylene and a variety of other alcohols, ketones and halogenated hydrocarbons. Methyl ethyl ketone or toluene is typically employed. However, to reduce flammability hazards, solvents such as trichloroethane or trichlorethylene may be preferred. The concentration of the release coating solution may vary over a wide range. Dilutions of the resin solution up to 1 to 100 have been successfully employed. Preferred concentrations of the release agents are about 0.1 to 1 percent or less depending on the resin.

In a most preferred embodiment of the present invention, to the release solution is added a small amount of a low molecular weight, hydroxyfunctional silicone compound of the general formula:

wherein R is a monovalent hydrocarbon radical, R' is selected from the group consisting of hydrogen and alkyl radicals containing from 1 to 6 carbon atoms, n has an average value from 0.9 to 1.9 and m has an average value from 0.1 to 1.5, and the compound having about four hydroxyl groups per molecular formula unit. The preferred concentration of the silicone compound, about 0.01 to 0.05 grams per milliliter of release coating solution, is sufficient to improve the release efficiency of the coated pressing surface without causing transfer of the release agent to the plastic surface. This result is surprising since it had been found that the silicone compound alone produced a good release but only with transfer of the silicone compound to the plastic innerlayer. Thus by combining the silicone compound with the release agent, an improved release was obtained without the disadvantage of transfer of the release coating to the plastic innerlayer. In addition, the silicone compound reduces the moisture sensitivity when the disilizane release agents are used.

The preferred method of applying the release coating solution is by simply pouring the dilute solution of release agent onto the pressing surface of the substrate in a single continuous stream. Preferably the substrate is inclined about 20 degrees from the vertical to encourage rapid drainage while avoiding dripping of the solution from the top edge onto the primary surface. Flow of the solution should begin away from the substrate, continue across the top of the primary surface from one side edge to the other in a simple, continuous, uniform pass, without recycling or multiple coating, and stop away from the substrate to avoid splashing, variation in flow, and stream splitting in order to insure uniformity of the coating.

The substrate is allowed to drain and dry in air at ambient temperature for at least 15 seconds, preferably several minutes. The solvent evaporates, leaving a thin uniform film on the pressing surface of the substrate. The coated substrate is then placed in a circulating air oven at a temperature typically between 200° and 600° F. (93° to 316° C.) for a sufficient time to cure the resin. Curing for about one hour at about 450° F. (about 232° C.) is preferred.

The cured release coating is preferably in the range of 5 to 10 microns thick with an optically smooth finish. By optically smooth finish and similar terms is meant a surface which upon visual inspection is free from such defects as haze, flow lines and gel particles. The presence of such defects in the pressing surface results in the creation of corresponding defects in the plastic surface during lamination thus rendering the laminate optically unacceptable.

A correlation between optical quality and the physical roughness of the pressing surface has been observed from profilometric measurements made by the National Bureau of Standards using a Talysurf 4/Interdata 3 stylus/computer system. The measurements were made along five lines on the coated substrate along areas of maximum imperfection. Four of the lines were essentially parallel and placed to coincide with areas of maximum deviation. The fifth line was perpendicular and intersected one by the other four at the single worst defect. Three profiles were obtained parallel to each of the five lines. Three stylus traverses were made along each profile.

For optically acceptable release surfaces, the arithmetic average deviation from a mean calculated from data from all forty-five traverses for each sample was less than about 1.1 microinches while the maximum arithmetic average deviation for an individual traverse was less than about 1.7 microinches.

Lamination of the Bilayer

A preformed sheet of thermoplastic material is placed between the optically smooth pressing surface of the release coated mold and a sheet of glass to which it is to be laminated. The thermoplastic material may be any of the various polyurethane or polyvinyl acetal materials known in the art to have desirable properties for safety glass laminates such as transparency, penetration resistance, shear and tear strength, and physical and chemical durability. The plastic lamina is preferably formed from a polyurethane composition prepared by reacting an organic polyisocyanate with a material having a multiplicity of active hydrogen sites.

Preferred polyurethanes include essentially linear thermoplastic polyurethanes with minimal crosslinking prepared from an organic diisocyanate and a hydroxy-terminated polyether or polyester. Useful diisocyanates include 2,4 toluene diisocyanate, 4,4' diphenylene diisocyanate, 1,5 naphthylene diisocyanate, 1,4 tetramethylene diisocyanate, 1,6 hexamethylene diisocyanate, 1,4 cyclohexyl diisocyanate, 4,4' methylene-bis(cyclohexyl isocyanate), 1,5 tetrahydronaphthylene diisocyanate and paraxylene diisocyanate. Useful hydroxy-terminated polyesters are described in U.S. Pat. No. 2,871,218 to Schollenberger.

The organic diisocyanate may be reacted with a poly(oxyalkylene) glycol to yield a polyurethane such as described in U.S. Pat. No. 3,764,457 to Chang et al. Most preferred are the polyurethane reaction products of a cycloaliphatic diisocyanate and a polyester diol such as described in U.S. Pat. No. 3,931,113 to Seeger et al. Preferably a chain extender such as a monomeric aliphatic diol or amine is included as a reactant. The polyurethane may be prepared by either the "one shot" method wherein all the reactants are mixed simultaneously, or by the "prepolymer" method wherein the polyester is first reacted with excess diisocyanate to yield a prepolymer which is then further polymerized or chain extended, with a diol, diamine or other isocyanate reactive hydrogen compound. The thermoplastic polymer composition is preferably made into sheet form by extrusion.

A controlled degree of adhesion between the glass and plastic laminae may be achieved by either treating the interface with a primer or by including adhesion agents in the polymer composition. Suitable primers which are preferably applied to the glass interfacial surface include various alkoxy silanes, such as gamma aminopropyltriethoxysilane or N—(beta amino ethyl) gamma aminopropyltrimethoxysilane, available from Union Carbide Corporation as "A-1100" and "A-1120" respectively. Preferred adhesion control agents are alkyl acid phosphates and organo-functional silanes added in combination to the polymer composition. Such adhesion control systems are described in U.S. Pat. No. 3,965,057 to Ammons et al.

The assembly of glass lamina-plastic lamina-release coated glass mold is preferably taped together along the periphery and placed in a plastic bag, preferably a laminated plastic bag of polyethylene glycol terephthalate (available under the trademark Mylar) with a bonded inner layer of polyethylene. The bag is evacuated, sealed, and placed in an oil autoclave. This method of laminating is described in detail in U.S. Pat. No. 3,311,517 to Keslar et al.

The assembly is subjected to sufficient temperature and pressure for a sufficient time to laminate the glass to the plastic. Typically a temperature between about 200° and 400° F. at a pressure between about 50 and 250 pounds per square inch are sufficient for lamination. The assembly is cooled to about 150° F., and the pressure is reduced. The assembly is removed from the autoclave and unwrapped.

The glass-plastic laminate is removed from the mold. A razor edge may be inserted in a corner of the assembly between the plastic and the mold to initiate the separation. A soft wedge may be inserted between the plastic and the mold to assist in the separation. The demolded laminate has an exposed plastic surface which reproduces the optically smooth surface of the mold with no optical defects imparted by either the release coating or the demolding operation.

The present invention will be further understood from the descriptions of specific examples which follow,

EXAMPLE I

A methyl phenyl siloxane resin solution marketed by the Dow Corning Corporation as "R-671 Resin", containing about 20 percent resin solids, is filtered and diluted with 19 parts by volume of methyl ethyl ketone to 1 part of resin solution.

The substrate to be coated is inclined about 20 degrees from the vertical to encourage rapid draining while preventing the solution from dripping from the top edge onto the primary surface.

The dilute solution is poured onto the surface to be coated, very near the top edge, carefully insuring that the entire surface area is covered. The stream of dilute solution is started flowing away from the substrate. The pouring is carried on from one side edge to the other in a smooth, continuous, single pass without recycling or multiple coating. Care is taken not to splash the solution, vary the flow, or allow the stream to split in order to insure uniformity of the film.

The substrate is allowed to drain and air dry for 5 minutes. A stripe of undiluted resin solution about ⅜ inch (0.95 centimeter) wide is painted along the edge to aid further in the initial separation of the pressing mold from the finished laminate. The coated substrate is placed in a circulating air oven at 450° F. (about 232° C.) for one hour to cure the coating.

The resultant cured coating has good release properties with respect to the plastic lamina in a bilayer laminate and exhibits optical quality as good as polished plate glass, thereby insuring an optically acceptable surface on the exposed plastic of the bilayer laminate. By analysis with the National Bureau of Standards Talysurf 4/Interdata 3 stylus/computer system, the release surface was determined to have an overall average deviation of under 1 microinch and a maximum arithmetic deviation for a single stylus traverse of about 1.6 microinches.

A sheet of thermoplastic polyurethane prepared by reacting poly(1,4 butylene adipate) diol, 4,4′ methylenebis(cyclohexyl isocyanate) and 1,4 butane diol is placed between the release coated surface of the mold and a matching glass lamina. The assembly is placed in a laminated bag of polyethylene and polyethylene glycol terephthalate which is evacuated, sealed, placed in an oil autoclave and subjected to a pressure of 200 pounds per square inch at 300° F. (about 150° C.) for 45 minutes.

The unit is cooled, the pressure is reduced and the assembly is removed and unwrapped. Demolding is initiated by inserting a razor blade in one corner of the assembly between the plastic layer and the release coated surface of the mold. The mold is then pried away and removed leaving a laminated safety glass structure of glass and plastic the exposed surface of which is optically acceptable.

EXAMPLE II

The methyl phenyl siloxane resin solution of Example I is filtered and diluted with 19 parts by volume methyl ethyl ketone. To the dilute solution is added, per milliliter of undiluted resin solution, 0.224 grams of a low molecular weight, hydroxy-functional silicone compound available from Dow Corning Company as "Z-6018" intermediate.

A surface of a glass mold is coated and the coating is cured as in Example I. The release coated surface has improved release properties compared with the mold of Example I and has similarly acceptable optical quality.

A polyurethane sheet is laminated to glass as in Example I using the above mold. Demolding is accomplished with less physical effort than in Example I to yield an optically acceptable bilayer laminate with no observable transfer of release agent to the plastic surface.

EXAMPLE III

A disilizane release agent solution marketed by Frekote, Inc. as "Frekote 33", containing about 0.5 percent solids, is diluted with 3 parts by volume anhydrous methyl ethyl ketone to one part Frekote 33 solution.

A glass mold is coated as in Example I at an absolute humidity no greater than 0.0 pounds of water per pound of dry air. When the solvent has evaporated, the coating is baked at a temperature of about 100° F. above the intended use temperature, in this case about 400° F. (about 204° C.) for about one hour.

The resultant cured coating has good release properties with respect to the plastic lamina, exhibits optical quality as good as polished plate glass and is more durable than the release coating of Example I. By analysis with the stylus/computer system, the overall arithmetic average deviation for the release surface was about 0.1 microinch, while the maximum arithmetic deviation for a single stylus traverse was about 0.2 microinch.

A polyurethane/glass laminate is prepared as in Example I. Upon demolding, the plastic surface of the bilayer laminate is optically acceptable.

EXAMPLE IV

The silizane release agent solution of Example III is diluted with 3 parts by volume of anhydrous methyl ethyl ketone. To the dilute solution is added, per milliliter of undiluted solution, 0.0975 grams of the low molecular weight, hydroxy-functional silicone compound of Example II.

A surface of a glass mold is coated as in Example I and the Coating is cured as in Example III. The release coated surface has improved release efficiency properties, compared with the mold of Example III and has similarly acceptable optical quality. Moreover, the release coating operation is less moisture sensitive and can be conducted at higher humidity with no formation of haze streaks.

The above examples are offered to illustrate the present invention and do not limit it. For example, substrates other than glass may be employed. A variety of solvents and a broad range of concentration are acceptable. Although bilayer laminates have been discussed in detail, the described release molds may be used with any multiple laminates having an exposed plastic surface. The release surfaces described herein function with cast sheets as well as with preformed sheets, and with thermoset as well as thermoplastic polymers, including thermoplastic polymers with a crosslinked surface. These and other modifications are included within the scope of the invention which is defined by the following claims.

We claim:

1. In a method for making a transparent safety glass laminate having an exposed plastic surface comprising the steps of:

a. assembling between a glass sheet to be laminated and a glass mold coated with a release agent, a polymer selected from the group consisting of polyvinyl acetals and polyurethanes;
b. bonding said polymer to said glass sheet; and
c. separating the glass mold from the polymer layer of the laminate, the improvement which comprises coating the glass mold on the surface which contacts the polymer layer with a composition comprising a release agent which contains
1. from 80 to 98 percent by weight phenyl methyl polysiloxane resin with from 1.0 to 1.7 hydrocarbon radicals per silicon atom;
2. from 1 to 10 percent by weight of a phenyl methyl siloxane fluid which has from 1.99 to 2.00 hydrocarbon radicals per silicon atom and which contains at least 1 percent by weight of silicon-bonded hydroxyl groups;
3. from 1 to 10 percent by weight of a nonhydroxylated methyl siloxane fluid which has at least 2.0 monovalent hydrocarbon radicals per silicon atom;

and a low molecular weight, hydroxy-functional silicone compound of the formula $R_nSi(OR')_mO_{4-n-m/2}$ wherein R is a monovalent hydrocarbon radical, R' is selected from the group consisting of hydrogen and alkyl radicals containing from 1 to 6 carbon atoms, n has an average value from 0.9 to 1.9 and m has an average value from 0.1 to 1.5, and the compound having about four hydroxyl groups per molecular formula unit.

* * * * *